(12) United States Patent
Watanabe

(10) Patent No.: US 6,571,612 B2
(45) Date of Patent: Jun. 3, 2003

(54) PROBE SCANNING METHOD

(75) Inventor: Kazutoshi Watanabe, Chiba (JP)

(73) Assignee: Seiko Instruments Inc. (JP)

( * ) Notice: Subject to any disclaimer, the term of this patent is extended or adjusted under 35 U.S.C. 154(b) by 3 days.

(21) Appl. No.: 09/754,651

(22) Filed: Jan. 4, 2001

(65) Prior Publication Data

US 2001/0032496 A1 Oct. 25, 2001

(30) Foreign Application Priority Data

Jan. 11, 2000 (JP) ........................................ 2000-006119

(51) Int. Cl.[7] ..................... G01B 5/28; G01N 13/10; G12B 21/22
(52) U.S. Cl. ........................................ 73/105
(58) Field of Search ........................ 73/105; 250/306, 250/307

(56) References Cited

U.S. PATENT DOCUMENTS

| | | | | | |
|---|---|---|---|---|---|
| 4,472,782 | A | * | 9/1984 | Suzuki | 33/505 |
| 5,490,132 | A | * | 2/1996 | Yagi et al. | 250/306 |
| 5,687,487 | A | * | 11/1997 | Johnson | 33/501.02 |
| 5,948,972 | A | * | 9/1999 | Samsavar et al. | 73/105 |

* cited by examiner

Primary Examiner—Daniel S. Larkin
(74) Attorney, Agent, or Firm—Adams & Wilks

(57) ABSTRACT

In a probe scanning method, a probe is scanned in a main scanning direction in an xy plane disposed between the probe and a surface of a sample while scanning the probe in a zigzag pattern. Physical quantities acting on the probe and the surface of the sample are measured at peaks of the zigzag pattern during the scanning step. Image data corresponding to the physical quantities measured at the different positions in the xy plane is then generated.

11 Claims, 5 Drawing Sheets

SCANNING IS PERFORMED IN THE FOLLOWING SEQUENCE
1 —> 2 —> 3 —> ———> 1 9 —> 2 0 —> 2 1

SCANNING IS PERFORMED IN THE FOLLOWING SEQUENCE
1 —> 2 —> 3 —> ———> 1 9 —> 2 0 —> 2 1

SCANNING IS PERFORMED IN THE FOLLOWING SEQUENCE
1 —> 2 —> 3 —> ——> 1 9 —> 2 0 —> 2 1

SCANNING IS PERFORMED IN THE FOLLOWING SEQUENCE
1 —> 2 —> 3 —> 4 —> 5 —> 6 —> 7 —> 8

D (1,1) = R (1)
D (1,2) = R (3)
D (1,3) = R (5)
D (1,4) = R (7)
D (1,5) = R (9)
D (2,1) = (R (1) + R (2)) / 2
D (2,2) = (R (2) + R (3) + R (4)) / 3
D (2,3) = (R (4) + R (5) + R (6)) / 3

$D(1,1) = R(1)$ $D(1,2) = (R(1)+R(2)+R(3))/3$ $D(1,3) = R(3)$ $D(1,4) = (R(3)+R(4)+R(5))/3$ $D(1,10) = (R(9)+R(10))/2$ $D(2,1) = (R(1)+R(2))/2$ $D(2,2) = R(2)$ $D(2,3) = (R(2)+R(3)+R(4))/3$ $D(2,4) = R(4)$ $D(2,5) = (R(4)+R(5)+R(6))/3$

PROBE SCANNING METHOD

BACKGROUND OF THE INVENTION

1. Field of the Invention

The present invention relates to a probe scanning method for a scanning probe microscope, and more particularly relates to a probe scanning method for an atomic force microscope using a force acting on a cantilever probe and a sample and for a scanning tunneling microscope using a tunnel current flowing between a probe and a sample.

2. Description of the Prior Art

The scanning probe microscope principally uses physical quantities acting on a probe and a sample when the former comes near the latter. Such a microscope is one of the new microscopes designed in order to observe physical quantities of a sample surface by measuring effects of the physical quantities acting on the probe.

The atomic force microscope or the scanning tunneling microscope is a kind of scanning probe microscope. The atomic force microscope uses an atomic force acting on a cantilever probe and a sample in order to control a distance between the probe and the sample, and measures physical quantities acting on them. The scanning tunneling microscope uses a tunnel current flowing between a conductive probe and a sample in order to control a distance between the probe and the sample, and measures physical quantities acting on them.

With the scanning probe microscope, the distance between the probe and the sample is controlled to be constant, a micro mechanism, such as a piezoelectric device, raster scans the sample surface, and quantities of control exerted by the micro mechanism are expressed by images, so that a shape or physical quantities of the sample surface can be observed.

The raster scan method which is a typical relative scanning method applied to the probe and sample will be described with reference to FIG. 3.

In the conventional raster scan method, the probe is relatively moved in the X direction with respect to the sample. Physical quantities acting on the probe and sample are measured each time the probe is moved in the X direction by +1 scanning unit. The measured physical quantities constitute one-picture-element data denoting a position of the probe and sample. When data of physical quantities are measured and collected for all the scanning units, the probe is moved by +1 scanning unit in the Y direction, and is positioned at the coordinate 0 in the X direction. The foregoing movements are repeated in order to measure the physical quantities acting on the surfaces of the probe and sample.

With the scanning probe microscope, physical quantities acting on the probe and sample are usually measured by precisely controlling the distance between them to several nm or less. When measuring the physical quantities acting on the probe and sample, the compatibility of high resolution and high speed measurement is subject to a certain limit, which is a problem in view of throughput improvement. This problem is particularly serious if a sample surface is uneven by approximately several 100 nm or more. In such a case, the probe and sample may be damaged if they crash against each other. Therefore, it is impossible to easily accelerate the scanning operation.

In the raster scan method of FIG. 3, it is necessary to increase the number of scanning units in the X and Y directions when performing the measurement with high resolution. However, throughput of the measurement is inversely proportional to the number of scanning units in the Y direction. In other words, if it takes time t to scan one line in the X direction, total time for scanning the sample surface is tX (i.e. the number of scanning units in the Y direction). The more scanning units there are in the Y direction, the longer the measurement time. Further, in order to accelerate the measurement, the number of scanning units in the Y direction has to be reduced, which means reduced resolution.

The invention is intended to overcome the foregoing problems of the related art, and provides a method which can not only maintain high resolution, but can also accelerate a scanning operation in order to reduce overall measuring time.

SUMMARY OF THE INVENTION

As described above, it is principally difficult for the conventional scanning probe microscope using the raster scan technique shown in FIG. 3 to perform the measurement with high resolution and at a high speed. According to the invention, when moving in a main scanning direction from a position 1 to a position 2 as shown in FIG. 3, a probe is staggered or scanned in a zigzag pattern relative to a sample in the X and Y directions (refer to FIGS. 1 and 2) in order to measure physical quantities acting on the probe and the sample.

In accordance with the scanning method shown in FIG. 1, the relative moving speed of the probe on an uneven surface of the sample is substantially equal to that of the raster scan method of FIG. 3. However, areas to be measured can be approximately doubled, which means substantial improvement in a scanning speed.

DETAILED DESCRIPTION OF THE PREFERRED EMBODIMENTS

The invention will be described with reference to the preferred embodiments shown in accompanying drawings.

Figure 1:
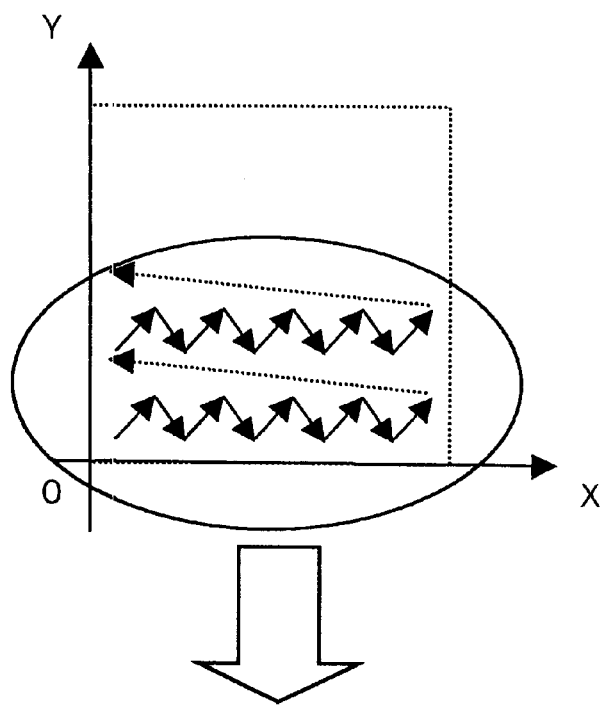
FIG. 1 shows an example of the scanning method according to the invention.
Figure 1:
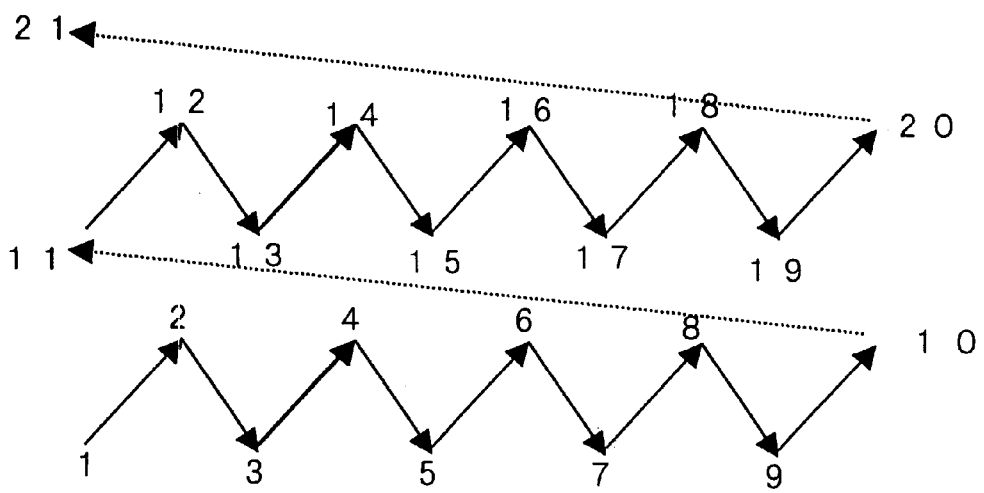

FIG. 1 shows in detail a scanning method according to the present invention embodied in the claims. Specifically, FIG. 1 relates to an embodiment in which a probe moves linearly in one scanning unit while FIG. 2 relates to another embodiment where the probe moves in the space of a sine wave in one scanning unit.

Figure 4:
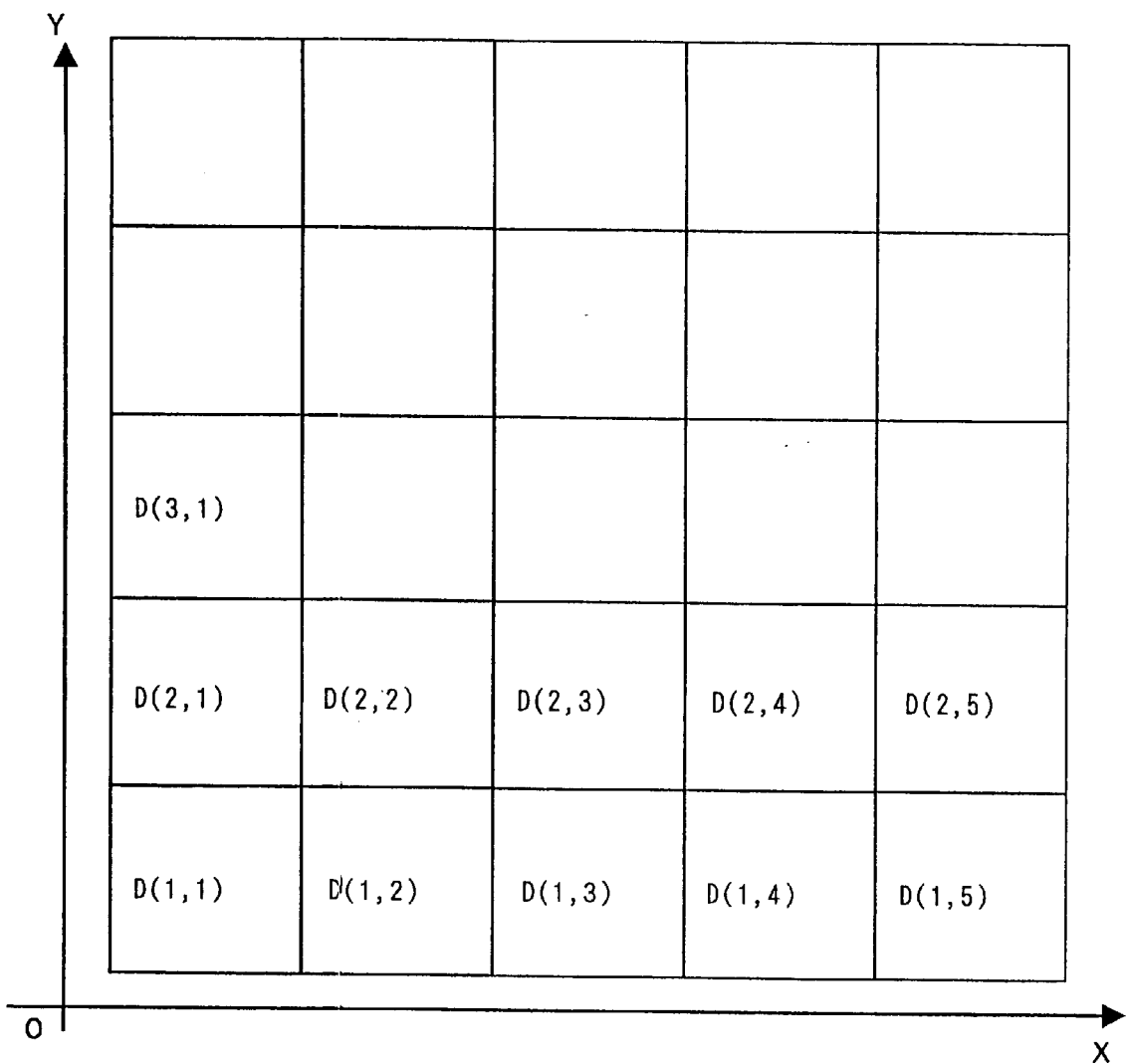
FIG. 4 shows an example of mapping measured data.
Figure 5:
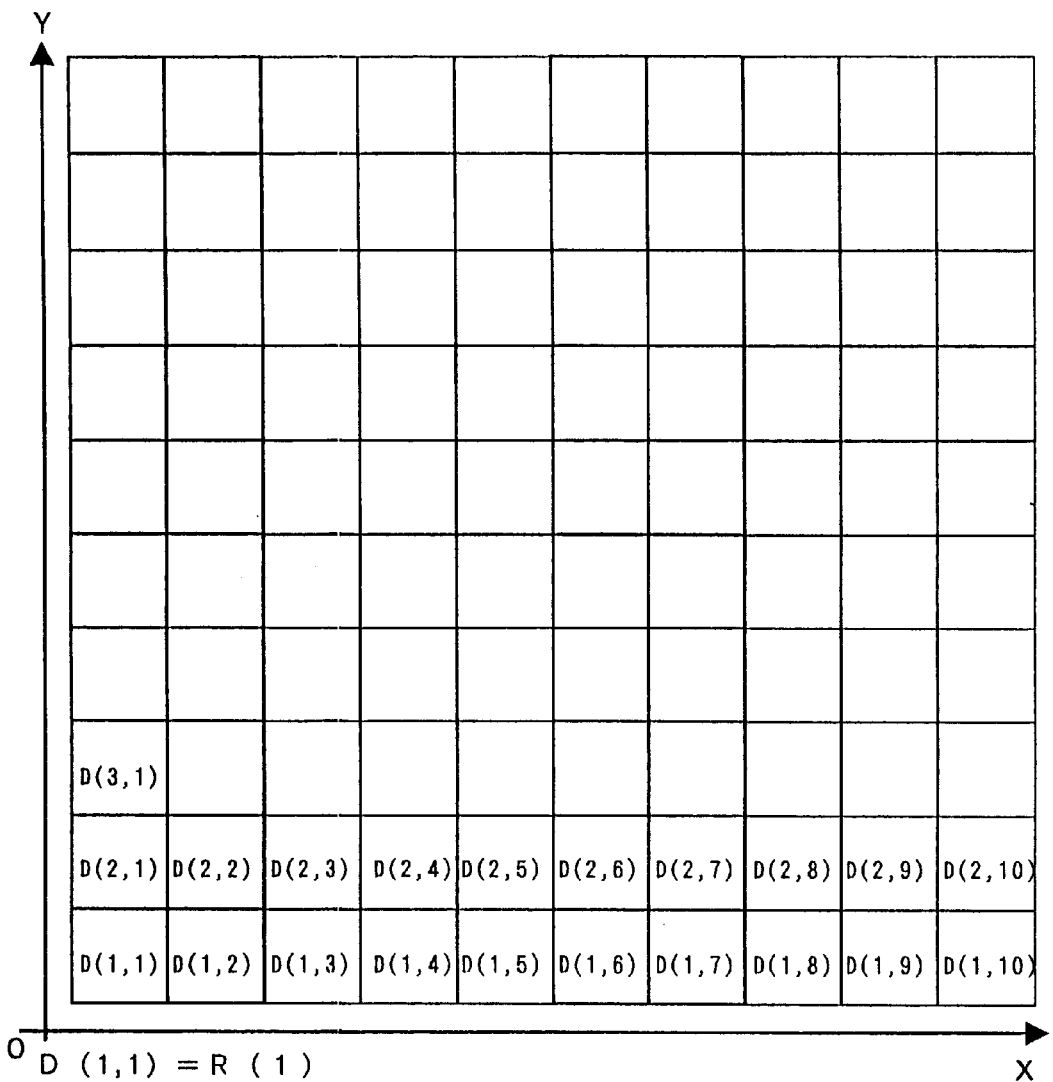
FIG. 5 shows another example of mapping measured data.

Further, FIG. 4 shows that data collected by the scanning method of FIG. 1 are mapped as images. FIG. 5 is similar to FIG. 1, in which the collected data are mapped as images.

Figure 2:
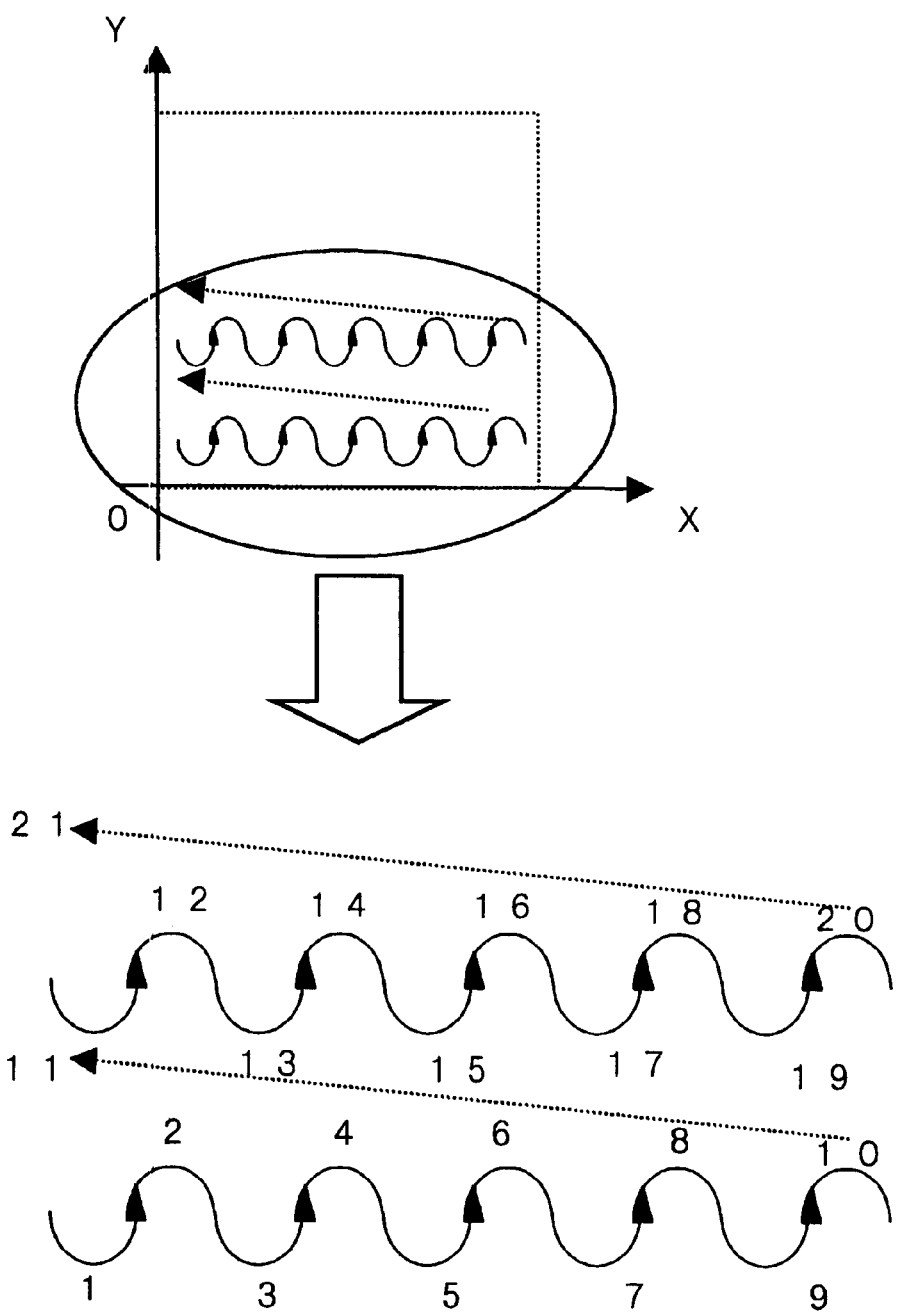
FIG. 2 shows another example of the scanning method of the invention.

Since the scanning methods shown in FIGS. 1 and 2 are basically identical, the method of FIG. 1 will be described hereinafter. Referring to FIG. 1, the probe is scanned in a main scanning direction in an XY plane while it is relatively staggered or scanned in a zigzag pattern with respect to a sample by +1 scanning unit in the X and Y directions so that physical quantities acting on the probe and the sample are measured. Next, the probe is staggered by +1 scanning unit in the X direction and by −1 scanning unit in the Y direction. This operation is repeated in order to measure physical quantities acting on the probe and the sample. The staggered probe can scan approximately two scan lines in the X direction at the same time, which is approximate to two scanning operations in the raster scan method of FIG. 3, and can improve the actual scanning speed. Further, the probe repeatedly moves by +1 and −1 scanning units in the Y direction, and is substantially unaffected by the uneven surface of the sample. This means that the relative speed of the probe with respect to the sample is approximately equal to that of the raster scan method of FIG. 3.

In the scanning method of FIG. 1, physical quantities between the probe and the sample are measured at positions 1, 2, 3, . . . , 19, 20, and 21. The measured physical quantity data are mapped as image data as shown in FIG. 4. In FIG. 1, each of the directions from positions 1–10 and positions 11–20 denotes a main scanning direction of the probe.

It is assumed here that R(1), R(2), R(3), . . . , R(19), R(20) and R(21) denote the data obtained at the positions 1, 2, 3, . . . , 19, 20, 21 in FIG. 1, and D(1, 1), D(1, 2), D(1, 3), . . . D(2, 4), D(2, 5), D(3, 1), etc. denote the data mapped as the image in FIG. 4. The data are mapped as the image data by applying the following related formula.

$D(1, 1)=R(1)$ $D(1, 2)=R(3)$ $D(1, 3)=R(5)$ $D(1, 4)=R(7)$ $D(1, 5)=R(9)$ $D(2, 1)=(R(1)+R(2))/2$ $D(2, 2)=(R(2)+R(3)=R(4))/3$ $D(2, 3)-(R(4)+R(5)+R(6))/3$

The image data at the surface positions in the X and Y directions such as the mapping data D(2, 2) and D(2, 3) which are present between the positions 2 and 4, 4 and 6, and so on, and D(2, 1) at one end and so on in FIG. 1 are not obtained by actual measurement but are interpolated using physical quantities which are actually measured near the foregoing surface positions. In the foregoing embodiment, the number of picture elements of the mapped data is equal to the number of collected data.

It is assumed here that R(1), R(2), R(3), . . . , R(19), R(20), R(21) denote the data obtained at the measurement positions 1, 2, 3, . . . , 19, 20, 21 in FIG. 1, and denote the data mapped in the image in FIG. 4. The data are mapped as the image data by applying the following related formula.

$D(1, 1)=R(1)$ $D(1, 2)=(R(1)+R(2)+R(3))/3$ $D(1, 3)=R(3)$ $D(1, 4)=(R(3)+R(4)+R(5))/3$ $D(1, 10)=(R(9)+R(10))/2$ $D(2, 1)=(R(1)+R(2)/2$ $D(2, 2)=R(2)$ $D(2, 3)=(R(2)+R(3)+R(4))/3$ $D(2, 4)=R(4)$ $D(2, 5)=(R(4)+R(5)+R(6))/3$

In this case, all the measured physical quantity data are used as image data. The image data at the surface positions in the X and Y directions such as the mapping data D(2, 3) and D(2, 5) which are present between the positions 2 and 4, 4 and 6, and so on, and mapping data D(1, 2)), D(1, 4) which are present between the positions 1, 3 and 3 and 5, and so on in FIG. 1, or the mapping data D(1, 10), D(2, 1) at an end, and so on are not obtained by actual measurement, but are interpolated using physical quantities actually measured near the foregoing surface positions.

In another embodiment, the number of picture elements of the mapped data is larger than the number of collected data. In this case, the number of mapping picture elements is four times more than the number of pseudo collected data.

Figure 3:
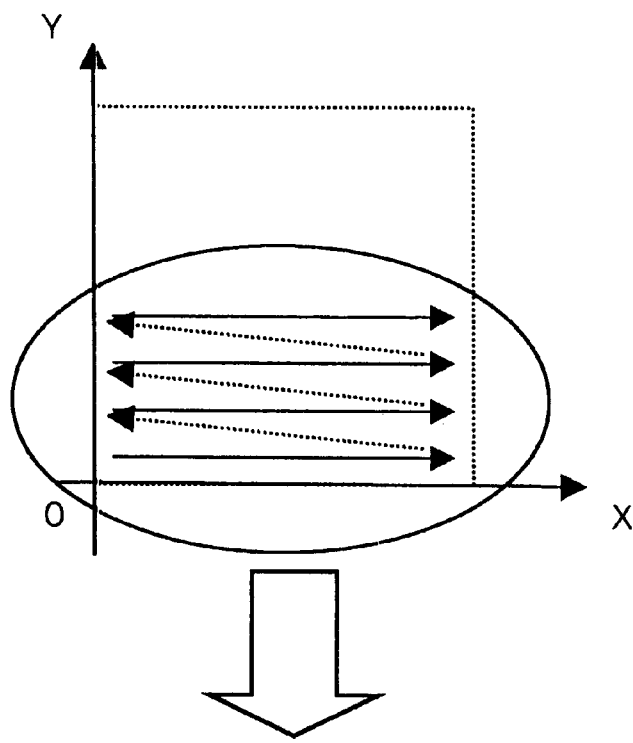
FIG. 3 shows an example of the conventional scanning method.
Figure 3:
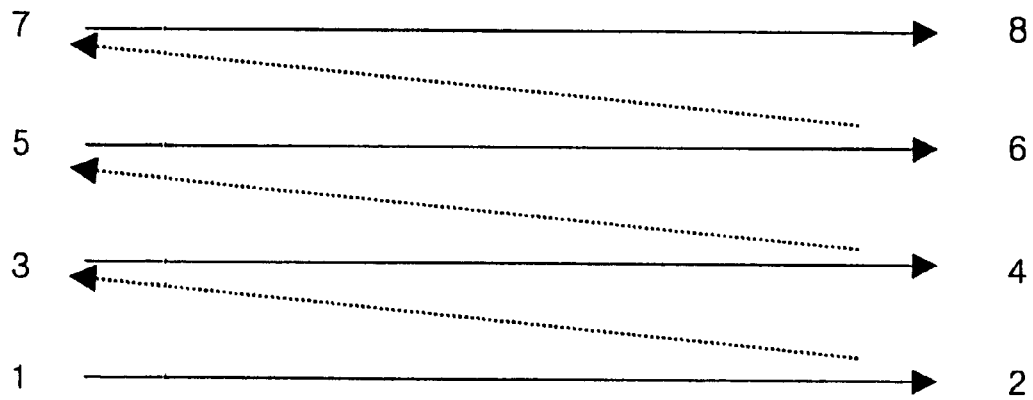

According to the invention, the probe is scanned in a main scanning direction while it is relatively staggered or scanned in a zigzag pattern over the uneven surface of the sample at a speed approximately equal to that of the raster scan method shown in FIG. 3. However, the scanning probe microscope can scan two scan lines at the same time, which is approximate to two scan operations in the raster scan method. This results in an improvement in actual scanning speed. Further, since the probe is staggered or scanned in a zigzag pattern across the surface of the sample, it is possible to extensively improve the resolution when the collected data are mapped into picture elements which are more than the number of collected data.

What is claimed is:

1. A probe scanning method, comprising the steps of: providing a scanning probe microscope having a probe; positioning the probe over a surface of a sample; repeatedly scanning the probe in a main scanning direction in an XY plane over the sample surface while scanning the probe in a zigzag pattern; measuring at peaks of the zigzag pattern physical quantities acting on the probe and the surface of the sample during the scanning step; and generating image data corresponding to the measured physical quantities using data corresponding to the measured physical quantities and the relative positions in the XY plane.

2. A probe scanning method according to claim 1; wherein the generating step includes the step of interpolating the data corresponding to the measured physical quantities to generate image data corresponding to positions in the XY plane at which physical quantities acting on the probe and the surface of the sample are not measured.

3. A method according to claim 1; wherein the scanning probe microscope comprises an atomic force microscope.

4. A method according to claim 1; wherein the scanning probe microscope comprises a scanning tunneling microscope.

5. A method according to claim 1; wherein the surface of the sample is uneven.

6. A method according to claim 1; wherein the zigzag pattern comprises a plurality of linear scanning units.

7. A method according to claim 1; wherein the zigzag pattern comprises a plurality of sinusoidal scanning units.

8. A probe scanning method, comprising the steps of: scanning a probe in a main scanning direction in an xy plane disposed between the probe and a surface of a sample while scanning the probe in a zigzag pattern; measuring at peaks of the zigzag pattern physical quantities acting on the probe and the surface of the sample during the scanning step; and generating image data corresponding to the physical quantities measured at the different positions in the xy plane.

9. A method according to claim 8; wherein the surface of the sample is uneven.

10. A method according to claim 8; wherein the zigzag pattern comprises a plurality of linear scanning units.

11. A method according to claim 8; wherein the zigzag pattern comprises a plurality of sinusoidal scanning units.

* * * * *